US00RE35861E

United States Patent [19]

Queen

[11] E Patent Number: Re. 35,861

[45] Reissued Date of Patent: Jul. 28, 1998

[54] APPARATUS AND METHOD FOR COMPARING DATA GROUPS

[75] Inventor: Cary L. Queen, Los Altos, Calif.

[73] Assignee: Advanced Software, Inc., Los Altos, Calif.

[21] Appl. No.: 638,722

[22] Filed: May 9, 1996

Related U.S. Patent Documents

Reissue of:

[64] Patent No.: 4,807,182
Issued: Feb. 21, 1989
Appl. No.: 839,326
Filed: Mar. 12, 1986

U.S. Applications:

[63] Continuation of Ser. No. 881,478, May 11, 1992, abandoned.

[51] Int. Cl.[6] ..... G06F 15/00; G06F 17/21

[52] U.S. Cl. ..... 395/772; 364/927.2; 364/927.61; 364/927.63; 364/934; 364/941; 364/941.5; 364/943; 364/943.44; 364/943.5; 364/947; 364/947.1; 364/947.2; 364/955; 364/955.6; 364/957; 364/957.1; 364/957.3; 364/960; 364/960.1; 364/962; 364/962.4; 364/DIG. 2; 395/340; 395/602; 395/619; 395/761

[58] Field of Search ..... 364/419.01, 419.08, 364/419.1, 419.13, 419.14, 419.17, 927.2, 927.61, 927.63, 934, 941, 941.5, 943, 943.44, 943.5, 947, 947.1, 947.2, 955, 955.6, 957, 957.1, 957.3, 960, 960.1, 962, 962.4, DIG. 2; 395/144–146, 772, 792, 761, 793, 340, 602, 619

[56] References Cited

U.S. PATENT DOCUMENTS

| | | | |
|---|---|---|---|
| 4,204,206 | 5/1980 | Bakula et al. | 340/721 |
| 4,212,077 | 7/1980 | Vittorelli | 364/900 |
| 4,531,201 | 7/1985 | Skinner, Jr. | 364/900 |
| 4,641,274 | 2/1987 | Swank | 364/900 |
| 4,701,745 | 10/1987 | Waterworth | 364/900 |
| 5,265,065 | 11/1993 | Turtle | 395/600 |

FOREIGN PATENT DOCUMENTS

| | | | |
|---|---|---|---|
| 0241156 | 11/1985 | Japan | 364/419 |
| 0075925 | 4/1986 | Japan . | |
| 0138364 | 6/1986 | Japan . | |

OTHER PUBLICATIONS

Heckel, "A technique for Isolating Differences Between Files", Apr. 1978, pp. 264–268.

Paul Heckel; "A Technique For Isolating Difference Between Files"; Apr. 1978, p. 265.

*Primary Examiner*—Robert A. Weinhardt

*Attorney, Agent, or Firm*—Blakely, Sokoloff, Taylor & Zafman LLP

[57] ABSTRACT

Method and apparatus for comparing original and modified versions of a document. The system of the present invention utilizes a hash number generator CPU to generate hash numbers for lines and sentences contained in the documents. Matching hash numbers are defined as anchorpoints and stored in an anchorpoint memory. A comparator CPU performs a character-by-character comparison of the respective documents radiating outward from each anchorpoint. This comparison generates identity blocks which are defined as blocks which are the same in both documents. Non-identity blocks are defined as difference blocks and are characterized as insertions or deletions depending on their status. A portion of the original and modified document is displayed in a split-screen format on a display, such as a CRT. Cursors on the top and bottom half of the screen identify corresponding portions of the documents. The second cursor is generated by taking advantage of the timer interrupt sequence of a CPU to direct the CPU to program instructions to generate the second cursor.

27 Claims, 3 Drawing Sheets

APPARATUS AND METHOD FOR COMPARING DATA GROUPS

Matter enclosed in heavy brackets [ ] appears in the original patent but forms no part of this reissue specification; matter printed in italics indicates the additions made by reissue.

*This is a continuation of application Ser. No. 07/881,478, filed May 11, 1992, now abandoned, which is a reissue application based on U.S. Pat. No. 4,807,182, issued Feb. 21, 1989, which issued from U.S. patent application Ser. No. 839,326, filed Mar. 12, 1986.*

BACKGROUND OF THE INVENTION

1. Field of the Invention

This invention relates generally to text processing systems and, more specifically, to a system for automatically ascertaining and isolating differences between text files, such as, for example, alphanumeric character text files.

2. Prior Art

One of the most common uses for computer systems, particularly micro computers, is text processing. Text processing typically involves the use of editors or other computer programs to create or modify files consisting of alphanumeric characters. Two major classes of text processing are "word processing", which is directed to producing standard alphanumeric documents, and "program editing" which produces lines of program source code resembling English text.

An important advantage of using a microprocessor-based system for text processing is the ability to edit easily and to revise documents. Words, sentences (such as text sentences, program lines, or character strings) or entire blocks of text are easily inserted, deleted, changed or moved using text processing systems. Use of these editing capabilities typically results in a revised file which may include much of the same material as the original file. However, it may also be rearranged or altered physically such that the two files are substantially different when perceptible copies or visual representations of both are compared. As further revisions are made, specific differences between the original and subsequent versions become increasingly difficult to identify.

To make the process of comparing different versions of program documents or character groups less difficult, systems have been developed that compare the contents of two text files and, if differences are found, indicate this fact to the user. These systems were originally developed for comparison of program source code files, though they are now frequently used when comparing English language or other high level language documents. Such prior art systems, however, suffer several major drawbacks.

A major shortcoming of the operation of prior art comparison systems is that the comparisons are made as line by line comparisons of the text in the two files. This approach is acceptable for editing of certain program code, where each line is discrete and text does not wrap around the end of lines. It is not sufficient, however, to adequately compare other types of document files. Standard documents, such as letters or reports produced by word processors, consist of sentences which often extend beyond the end of one line and continue to the following line. Thus, insertion of even a single word or character in a line may cause the end of that line to be pushed onto the subsequent line, thereby causing all of the following lines to be shifted. A text comparison system which operates line by line may detect and identify an initial addition or deletion, but it will also detect and identify all subsequent lines that have been shifted down and therefore changed. This result is clearly undesirable and inaccurate, since this latter text has not in fact been changed, but rather has merely shifted position.

Another major flaw in prior art text comparison systems is that they generally produce as output only a listing of the lines that differ between the two files. Though the user may view both the original and the changed text, he cannot view that text in proper context in the document. Further, since such prior art comparison systems only print out the text of the differing line, and perhaps a few surrounding lines, it is often difficult or impossible to ascertain exactly what specific changes (e.g., insertions or deletions) resulted in the displayed differences between the files. This is particularly true where line shifting, as described above, has occurred.

SUMMARY OF THE INVENTION

The present invention provides methods and apparatus which permit identification of specific differences between two character files, (e.g., text files) and simultaneously display of those differences in the context in which they occur. In addition, the nature of the change that creates the difference (e.g., insertion, deletion or movement of text) is specifically identified.

In accordance with the presently preferred embodiment of this invention, means are provided for copying the text of the two documents to be compared into memory. Each line and sentence in the first document is then converted into a number using a process known as hashing. These numbers are stored in a list in memory, along with the location of that line or sentence in the first document.

The hashing process is then repeated for each line and sentence in the second document. As each resulting number is generated, it is compared with numbers derived from the first document. Where the numbers match in both documents, this fact is recorded, along with the position of the matching line/sentence, in the second document.

For each of the matching numbers from the two documents, the text at the recorded locations is compared to generate the largest possible block of identity. When an identity block of at least a specified minimum size is found, it is recorded in memory along with its location in both documents. After this process is completed for all of the matching numbers, the remaining text, which differs between the two documents, is broken into "difference blocks". For each difference block, the above steps are repeated on short phrases rather than lines or sentences to produce a finer level of comparison. The identity blocks are then classified as either "same" blocks or "moved" blocks depending on whether the relative positions of text in the two documents is the same. Difference blocks are also classified, where appropriate, as either "deletion" or "insertion" blocks if the text is missing from one of the original files.

Finally, the text of both documents is displayed simultaneously on a CRT or other suitable output device in small segments. The user is free to use the keyboard to position the cursor anywhere in the first document, and a second cursor is automatically placed in the corresponding location in the second document. Further, the display indicates whether the text currently being viewed is the same or has been changed, moved, inserted or deleted in the second document.

The preferred embodiment of the present invention includes means for reading the documents to be compared, storing the documents in memory, making a comparison and displaying text. Further, logic means are provided for hashing and comparing of the documents as well as for displaying documents simultaneously.

DETAILED DESCRIPTION OF THE INVENTION

Notation and Nomenclature

Figure 1:
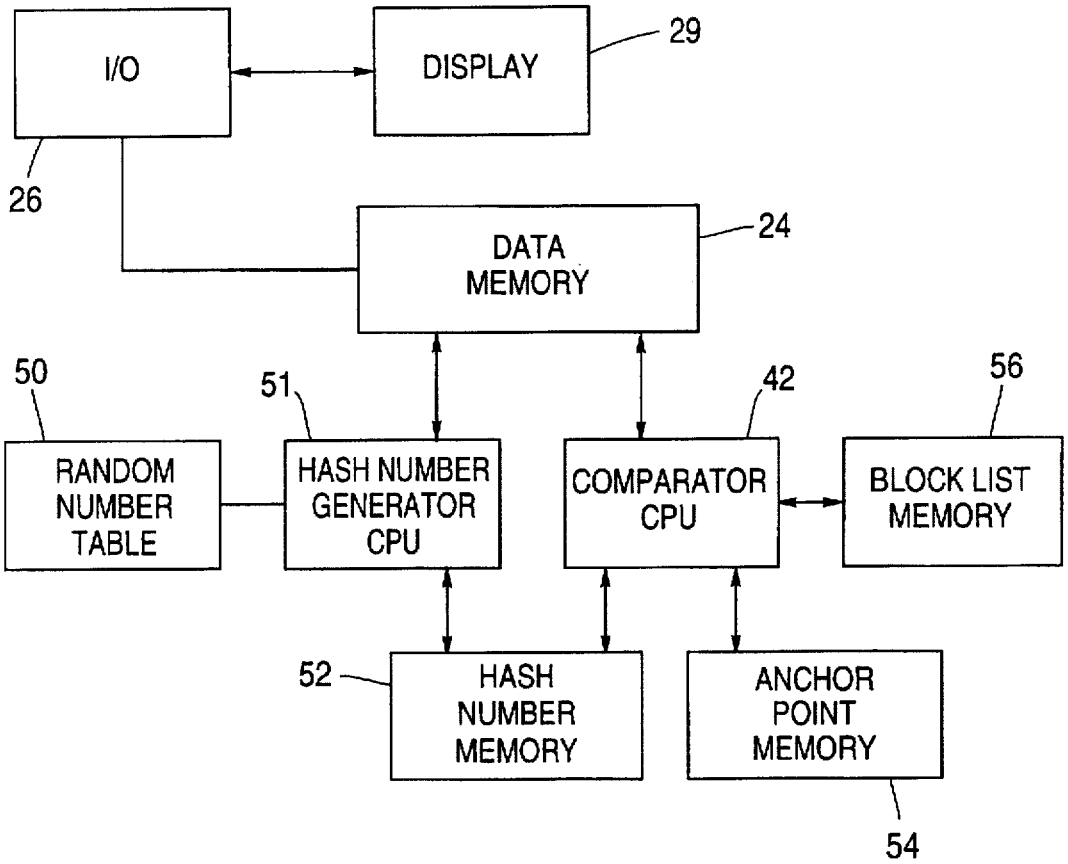
FIG. 1 is a block diagram of the apparatus of the present invention.

The detailed description which follows is presented largely in terms of algorithms and symbolic representations of operations on data bits within a computer memory. The algorithmic descriptions and representations are the means used by those skilled in the data processing arts to most effectively convey the substance of their work to others skilled in the art.

An algorithm is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared and otherwise manipulated. It proves convenient at times, principally for reasons of common usage, to refer to these signals as bits, values, elements, symbols, characters, terms, numbers, or the like. It should be kept in mind, however, that all of these and similar terms are to be associated with the appropriate physical quantities and are merely convenient labels applied to these quantities.

Further, the manipulations performed are often referred to in terms, (such as adding or comparing) which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases the distinction between the method of operations and operating a computer, and the method of computation itself should be noted. The present invention relates to methods of operating a computer in processing electrical or other (e.g., mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms presented herein are not inherently related to any particular computer or other apparatus. In particular, various general purpose machines may be used with the teachings herein, or it may prove more convenient to construct more specialized apparatus to perform the required method steps. The required structure for a variety of these machines will appear from the description given below.

In addition, in the following description, numerous details are set forth such as algorithmic conventions, specific numbers of bits, etc., in order to provide a thorough understanding of the present invention. However it will be apparent to one skilled in the art that the present invention may be practiced without these specific details. In other instances, well-known circuits and structures are not described in detail in order not to obscure the present invention unnecessarily.

DETAILED DESCRIPTION

The following detailed description is divided into several sections. The first of these discloses the general configuration of a system for comparing documents. Later sections address specific aspects of the present invention, including means for identifying corresponding blocks of text in two files, ascertaining changes in text blocks, and providing output of the results of the comparison.

GENERAL SYSTEM CONFIGURATION

FIG. 1 is a block diagram illustrating the preferred embodiment to the present invention. The system includes Input/Output (I/O) means 26, data/system memory 24, random number table 50, hash number generator CPU 51, comparator CPU 42, block list memory 56, hash number memory 52, anchorpoint memory 54 and display 29.

Groups of data to be compared are entered into the system through the I/O 26. In the preferred embodiment of the present invention, the system is used to compare drafts of documents and this description is written in regard to document comparison. It will be understood, however, that the system may be utilized to compare any two groups of data or characters that are capable of storage in a memory. An original and modified version of the subject document is stored in the data/system memory 24. In the preferred embodiment of the present invention, the data/system memory consists of a Random Access Memory (RAM).

TEXT STORAGE AND HASHING

Each document stored in data/system memory 24 consists of lines of alphanumeric characters represented by binary codes. In general practice, codes of 7 or 8 bits for each character are used. Thus, in addition to upper and lower case letters and numerals, a number of punctuation and special purpose marks can also be stored. Various coding schemes, such as IBM Extended ASCII, (8 bits) may be used.

Figure 2:
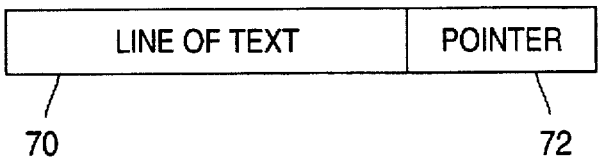
FIG. 2 illustrates the storage structure for lines of text stored in the memory in the present invention.

In order to more efficiently utilize memory, the lines of each document are stored as a linked list, as depicted in FIG. 2. For each line of text 70 stored, a pointer 72 is also stored. This pointer contains the address in data/system memory 24 where the next line is stored. Utilizing this scheme, data/system memory 24 need not consist of a contiguous block of memory large enough for each document, but may be made up of numerous small blocks, located wherever memory is available, and chained together in the linked list. The memory location in data/system memory 24 of the first line in each file is saved at a known location so that the contents of the files may be retrieved.

Although any two text files can be compared using this invention, a frequent use is to compare two versions of the same document or program. As noted, for purposes of this discussion, it is assumed that such a comparison is being made. For convention and clarity, the original (unmodified)

document will be referred to as file 1 and the later (modified) version as file 2. Of course, in practice it is left to the user to specify which of the files is to be considered the original version and which the modified version. Reversal of the two files will not affect the comparison process, though text which was inserted may be identified as deleted and vice versa.

Once the text of both files has been stored in data/system memory, each line of file 1 is converted to a number by hashing. In the preferred embodiment of the present invention, the hashing process is performed by a hash number generator CPU 51 coupled to data/system memory 24. Although any number of currently available microprocessors can serve as hash number generator CPU 51, the 8086/88 family of microprocessors, manufactured by Intel Corporation of Santa Clara, Calif. are particularly well suited for use with the present invention. In operation, the hash number generator CPU retrieves a line of text from data/system memory 24. The binary code value of the first character in the line (a number from 0 to 255) is taken as the base hash value. The value of the following character is then used as an index into random number table 50, coupled to hash number generator CPU 51 and containing 256 random numbers in the preferred embodiment. The value stored at the location indexed by the second character of the line is combined with the base hash value by applying an exclusive OR (XOR) function. The XOR function is defined such that each bit in the result will be set to 1 if the corresponding bit in one, but not both, of the original bytes is set to 1. The result of this XOR becomes the temporary hash value.

This process is then repeated for each subsequent character in the line, using it as an index into the random number table 50 and generating a new temporary hash value by XORing the random number retrieved with the previous temporary hash value. The result after the last character in the line is processed is the final hash number.

This final hash number is then stored in hash number memory 52, along with the location in the file, by line number, of the line from which this number was generated. Hash number memory 52 is coupled to hash number generator CPU 51. This process is repeated for each remaining line until all lines have been converted into hash numbers. The same procedure is then repeated for the entire file again, sentence by sentence (rather than line by line). With sentences, the location information (stored along with the hash number in hash number memory 52), includes both the line number and position within the line of the first character in the sentence. At the completion of this process, hash number memory 52 will contain a hash number and location data for each line and each sentence in file 1.

It should be noted that hashing described above is designed such that identical lines or sentences will have identical hash numbers. Due to the nature of hashing it is also possible, though not likely, for two different line or sentences to have the same hash number, which is known as a collision. However, this possibility is substantially minimized by use of the random number table 50. The entries in this table can either be generated by the computer or included as part of a document comparison routine. Though an excessive number of collisions will tend to reduce the comparison speed, accuracy of the results will not be affected, as will be seen in the discussion of the identity block identification procedure below.

Next, the above hashing process is repeated for the text of file 2. However, as each hash number from file 2 is generated, it is compared with the hash numbers from file 1 in hash number memory 52, rather than being stored. For purposes of efficiency, hash numbers generated from lines need only be compared with hash numbers from lines and hash numbers from sentences with hash numbers from other sentences. This comparison is performed by comparator CPU 42 which is coupled to data/system memory 24, hash number memory 52 and hash number generator CPU 51. In the preferred embodiment, comparator CPU 42 comprises a microprocessor such as an Intel 8086/88 type of microprocessor. Although hash number generator CPU 51 and comparator CPU 42 are shown as separate processors in FIG. 1, a single microprocessor may be utilized to perform both functions. By way of example, the Intel 8086/88 family is capable of performing both functions.

Each match between the hash number from file 2 and a hash number from file 1 is called an "anchorpoint" and is copied to anchorpoint memory 54, along with the location of the corresponding line or sentence in each file. Anchorpoint memory 54 is coupled to comparator CPU 42.

IDENTITY BLOCK IDENTIFICATION

The anchorpoints generated as described above contain the locations in each file of the beginning of a segment of text which matched in both Files. In order to speed comparison, these segments of matching text are expanded as much as possible. The result is the creation of "identity blocks" of text which are the same in both files, generated as follows:

For each anchorpoint stored in anchorpoint memory 54, the text location in each file is identified. The size of the block of matching text is then expanded by performing a character-by-character comparison of the text of both files, radiating outward from the anchorpoint. This comparison is performed by comparator CPU 42. Comparator CPU 42 is coupled to data/system memory 24. After reading an anchorpoint from anchorpoint memory 54, comparator CPU 42 locates the text location in data/system memory 24. Comparator CPU 42 then undertakes a character-by-character comparison of the matching text on either side of the anchorpoint. Thus, if the anchorpoint represents text at some point X in file 1 and identical text at some point Y in file 2, the (X+1)th character is compared with the (Y+1)th character, then the (X+2)th with the (Y+2)th, and so on until they fail to match. The point where the difference occurs becomes one end of the identity block. However, if this difference occurs within the body of a word, the end of the identity block is taken to be the last character of the preceeding word. This character by character comparison is then repeated in the reverse direction, starting again at the anchorpoint and comparing the (X−1)th character with the (Y−1)th character, and so on, until they no longer match. When these comparisons are complete, the beginning and end points, in both files, of an identity block containing the original anchorpoint will have been identified.

If the identity block is below a set minimium size, $M_{ib}$ (20 non-blank characters in the presently preferred embodiment) it is ignored. This will normally be the case if the anchorpoint was created by a hash collison rather than lines or sentences that match. Otherwise, the location information and a notation that this is an identity block are stored in block list memory 56, coupled to comparator CPU 42. Any anchorpoints contained within the boundaries of identity block are deleted from anchorpoint memory 54. The above-described block extension process is then repeated for each anchorpoint remaining in anchorpoint memory 54, until all anchorpoints have been deleted by being converted to identity blocks or by being found within an identity block.

OVERLAP ELIMINATION

In the case where a block of text from file 1 appears more frequently in file 2, an overlap of identity blocks will occur. For example, if a quotation which appears only once in file 1 is used twice in file 2, the identity blocks generated will overlap, with both blocks covering a portion of the same text. This can result in one of the text blocks being improperly identified as present in File when it in fact was not.

Overlapping blocks are eliminated by associating one of the blocks from file 2 with the identical block in file 1, and reclassifying the remaining blocks from file 2 as difference (insertion) blocks.

This is accomplished by using paragraphs or sentence breaks in the text to determine which of the blocks in file 2 should be associated with the identical block from file 1. Thus text which appears within the same sentence or paragraph as the block in question will be deemed to correspond. Duplicate blocks found outside of the paragraph or sentence in question are reclassified as difference blocks.

DIFFERENCE BLOCK IDENTIFICATION

After all of the identity blocks have been established, according to the above procedure, text which differs between the two files will not be included in any identity blocks. This remaining text is broken into "difference blocks", separated naturally by the identity blocks.

Specifically, each section of different text from file 1 is associated with the corresponding different text at the same relative location in file 2 to form a difference block. This block information is then stored in block list memory 56, along with a notation that it is a difference block, in the same manner as with the identity blocks.

FINER COMPARISON

To provide a finer level of comparison, the text within each difference block is subjected to the method described above, including hashing anchorpoint identification and identity/difference block identification. However, on this pass the hashing is applied to short groups of words or phrases, rather than to entire sentences or lines. In addition, the minimum size required to process an identity block, $M_{ib}$, is also reduced. The method otherwise proceeds as previously described, without the need to read data into memory since the text making up the difference blocks is already present in memory.

After this second phase is completed, the original difference blocks are broken into groups of smaller differences and identity blocks all stored in block list memory 56. The method is then repeated on any remaining difference blocks. In the preferred embodiment of the present invention, these iterative comparisons are thereby hashing on successively smaller groups of characters, until no further blocks of identical text can be found in the preferred embodiment within the difference blocks. However, the iterative method stops when identity blocks become smaller than 5 characters.

BLOCK CLASSIFICATION

After all identity blocks and difference blocks have been identified and stored in block list memory 56, the list is examined to further classify the blocks. Each identity block is classified as a "moved" block if the text is not located in the same relative position in both files. Otherwise, it is marked as a "same" block.

Certain difference blocks are classified as either "insertion" or "deletion" blocks by examining the text at the locations in each file stored in block list memory 56. If the relative location in file 2 of the text block in file 1 contains only blank space, the block is marked as a "deletion" block. If file 1 contains only blank space which corresponds to text in file 2, the block is then marked as an "insertion" block. In the case where both files have non-blank text, the block simply remains marked as a difference block.

DISPLAY OF RESULTS

Figure 3:
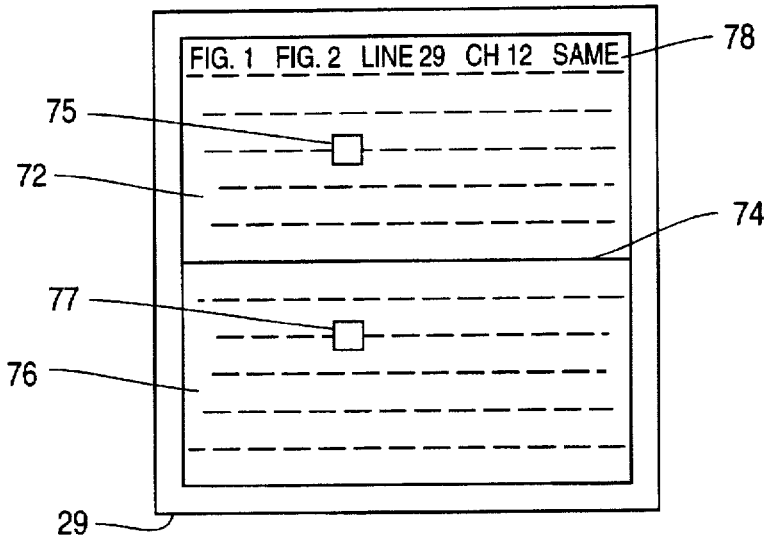
FIG. 3 illustrates a typical display produced by the present invention.

When identification and classification of blocks is completed, the text of both files is displayed simultaneously, with the differences between them indicated. In the presently preferred embodiment, display 29 is a CRT and is capable of displaying up to 25 lines of text at one time, and each file is displayed 11 lines at a time. FIG. 3 shows the state of this display at a given instant.

Eleven lines of text, (initially the first eleven) from file 1 are copied from data/system memory 24 (FIG. 1) to top half 72 (FIG. 2) of CRT 29. A dividing line 74, consisting of a row of any suitable character (a solid block character in the present embodiment) is displayed on line 13 of display 29 to divide the display. The 11 lines from file 2 that correspond to the 11 displayed lines of file 1 according to the block structure, are copied from data memory 24 and displayed on bottom half 76 of CRT 29. The top line 78 of the CRT is reserved for display of status messages to the user, including the names of the files being compared, the current location in the document, and the nature of the text being examined (e.g., same, inserted, deleted, different, moved).

For each character on the screen, the block containing that character is determined by examining block list memory 56. If the character is in a difference, insertion, deletion or moved block but not a same block, the character is brightened on display 29 using I/O circuitry 26. Hence all text on the screen that has been changed in any way is highlighted by brightening and thus made readily apparent.

In addition to the text display, a cursor is displayed on each half of the CRT 29. The upper cursor 75 is controlled by the user. User commands are interpreted to allow the cursor to be positioned on any character in file 1. When the cursor is moved to a position in the file beyond those lines presently displayed, the text displayed on top half 72 is scrolled up or down accordingly, so that the text under the cursor is always visible. If necessary, the text on bottom half 76 is then also scrolled to maintain its correspondence with top half 72. Lower cursor 77, displayed on bottom half 76 of the display 29 is not under user control, but follows the motion of upper cursor 75. Specifically, lower cursor 77 is always over the character in file 2 that corresponds to the character under upper cursor 75 in file 1, i.e., lower cursor 77 is over the character in file 2 that is in the same identity or difference block as the character in file 1 and is at the same relative position in that block.

At each position of upper cursor 75, the identity/difference block which contains the character underneath the cursor is identified by examining block list memory 56. When the block containing the character at that location is located, the categorization information for that block (i.e. same, different, inserted, deleted or moved) is extracted from block list memory 56 and an appropriate message is displayed on Top Line 78. Thus, as the user moves the Upper Cursor 75 through file 1, he is not only able to simultaneously view the corresponding text in file 2, but is continuously apprised of the nature of the difference between the two files at the current location. If the user gives an appropriate command, the upper cursor 75 will automatically be placed at the beginning of the next difference block. Therefore, the user can move from change to change in the files while skipping over unchanged text.

Although, in the preferred embodiment, a CRT is utilized as display 29, other types of display may be advantageously utilized with the present invention. For example, display 29 may comprise a printer. When the present invention is utilized with a printer, the user may select a printout of the original document, modified document or both. When a printout is provided, sections that have been inserted into the original document may be identified by underlining. Deleted sections may be identified by placing a caret at the beginning and end of the deleted passage. Changed passages may be identified with the use of a caret in conjunction with underlining. It will be understood, that the above methods of printout are given by way of example only, and any suitable means of identifying changes in the document may be utilized.

SECOND CURSOR GENERATION

Lower cursor 77, usually displayed as a flashing underscore, is generated by the video display circuitry 82 (FIG. 4) portion of I/O circuitry 26, under control of comparator CPU 42 (FIG. 1). However, most micro computer systems provide no means for displaying a second cursor, upper cursor 75, which is necessary to the above-disclosed simultaneous display method. The present invention overcomes this shortcoming by utilizing a CPU timer interrupt to generate a second cursor.

Figure 4:
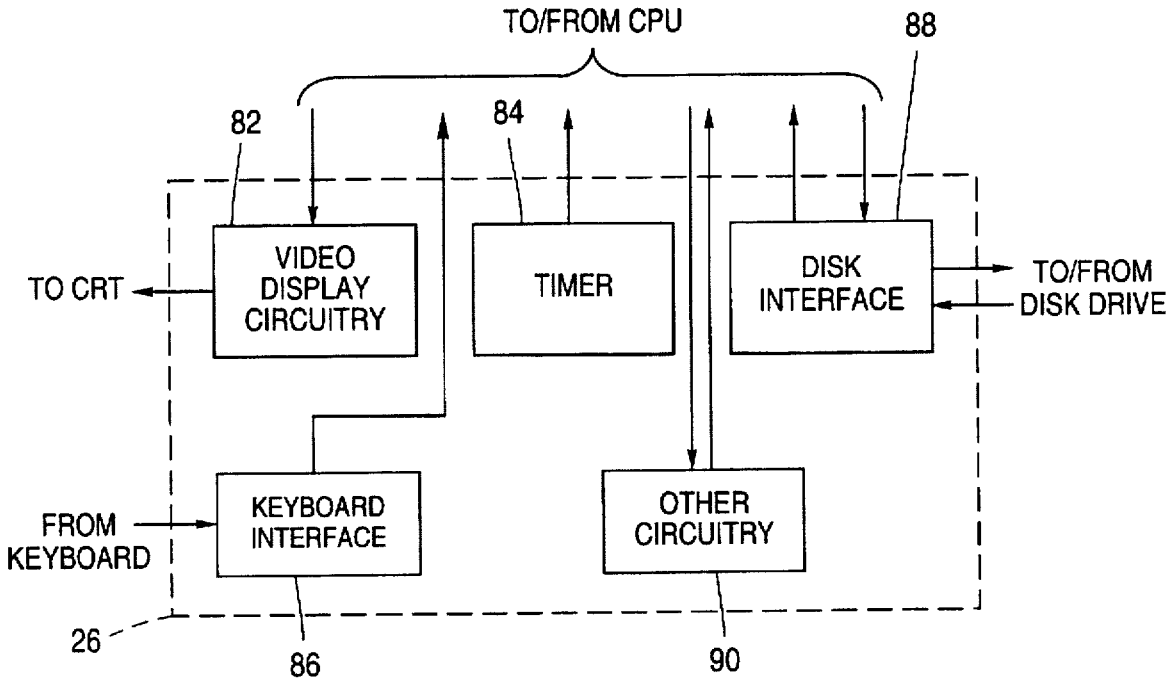
FIG. 4 is a block diagram of I/O circuitry of the present invention.

As shown in FIG. 4, I/O Circuitry 26 contains hardware timer 84, which usually consists of a fixed frequency oscillator and counter circuits. These devices are configured such that a signal is generated at regular intervals (18.5 times each second in the preferred embodiment). This signal is known as the "timer interrupt" and is coupled to interrupt detect lines on CPU 22 such that each time the timer interrupt signal is asserted, the CPU completes the current instruction, saves its present location and register information, and jumps to a predetermined location.

Figure 5:
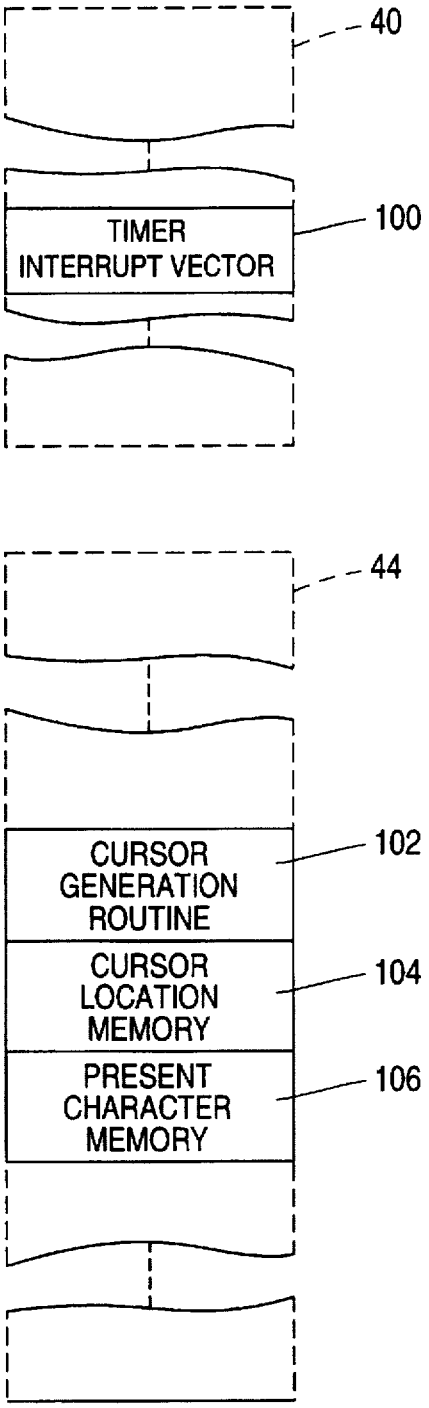
FIG. 5 illustrates a typical arrangement of the elements of the display routine within the memory of in the present invention.

This location, known as timer interrupt vector 100, is shown in FIG. 5 as part of data/system memory 24 (FIG. 1). Instructions stored at timer interrupter vector 100 cause the CPU 42 (FIG. 1) to begin executing cursor generation routine 102 (FIG. 5), which is located within data/system memory 24 (FIG. 1). Cursor location 104 contains the desired location for upper cursor 75 at any given time. Cursor character 106 contains a copy of the character in file 1 at the same relative location as specified in cursor location 104.

To generate the upper cursor 75, a suitable character is chosen to be displayed as a cursor. In the presently preferred embodiment this is the solid block character which is available under IBM Extended ASCII. When the cursor generation routine 102 is first entered, the character displayed on top half 72 (FIG. 3) at the cursor location 104 is replaced on the display with the solid block character. The cursor generation routine then exits and the CPU returns from the timer interrupt to continue processing, or to execute other routines triggered by the timer interrupt.

On the following timer interrupt, providing the upper cursor 75 has not moved (which would be indicated by a new location in cursor location 104) the solid block character is replaced with the original character in that location, stored in cursor character 106. If the cursor has been moved since the last timer interrupt, then the character from the previous location is restored from cursor character 106 and the character at the present cursor location is saved in cursor character 106 and replaced by the solid block character. The cursor generation routine 102 again exits to await the next timer interrupt. This process of alternating the actual character at the upper cursor 75 location and the solid block is continued indefinitely with the actual location of the cursor display changing as the upper cursor 75 is moved by the user.

It should be noted that because of the relatively high frequency of the timer interrupt, alternating characters on each interrupt may not provide a pleasing display. In order to compensate for this, the solid block and the character under upper cursor 75 may in fact be swapped less frequently, perhaps once every several timer interrupts, to achieve a more pleasant result. Further, the amount of time during which the solid block is displayed need not be equal to that during which the underlying character is displayed. In the presently preferred embodiment, it has been found that the most desirable display is achieved by displaying the solid block for 2 timer interrupts, followed by the underlying character for 4 timer interrupts, followed again by the block for 2 interrupts and so on.

CODING DETAILS

No particular programming language has been indicated for carrying out the various procedures described above. This is in part due to the fact that not all languages that might be mentioned are universally available. Each user of a particular computer will be aware of the language which is most suitable for his immediate purpose. In practice, it has proven useful to implement the present invention in a combination of 8088 Assembly Language and PASCAL.

Because the computers which may be used in practicing the instant invention consist of may diverse elements and devices, no detailed program listings have been provided. It is considered that the operations and other procedures described above and illustrated in the accompanying drawings are sufficiently disclosed to permit one of ordinary skill in the art to practice the instant invention or so much of it as is of use to him.

Thus, methods and apparatus which are most advantageously used in conjunction with a digital computer and related peripheral devices to provide automated comparison and simultaneous display of two documents have been disclosed. The present invention's use of hashing on sentences and phrases and identity/difference block identification provides a degree of accuracy and convenience unavailable in the prior art. Further, the means provided for generating a second cursor allow a simultaneous display not found in the prior art.

While the present invention has been particularly described with reference to FIGS. 1–5 and with emphasis on certain computer systems and peripheral devices, it should be understood that the figures are for illustration only and should not be taken as limitations upon the invention. In addition, it is clear that the methods and apparatus of the present invention have utility in any application where automatic test comparison is desired. It is contemplated that many changes and modifications may be made, by one of ordinary skill in the art, without departing from the spirit and scope of the invention as described above.

I claim:

1. An automated *text* comparison system, comprising:

input means for receiving commands, and for providing electronic signals representing a plurality of characters [including] *representing* words, *short groups of words or phrases,* and sentences;

memory means coupled to said input means for storing as binary representations at least first and second groups of said characters;

processing means coupled to said memory means and to said input means for detecting and identifying differences between said words, *short groups of words or phrases,* and sentences in said first and second groups of said characters *when said differences do not consist of a line of text or a group of lines of text and regardless of whether or not the text wraps around an end of a line or a plurality of lines*;

display means coupled to said processing means for providing a display of said differences *by displaying the text with the differences designated within the text lines.*

2. The system of claim 1 wherein said processing means includes reading means for reading and comparing said first and second groups of characters from said memory means.

3. The system of claim 2 wherein said processing means includes writing means for writing said groups of characters from said memory means to said display means.

4. The system of claim 3 wherein said processing means includes first logic means for generating hash numbers, said hash numbers being derived from said binary representations of said characters in said first and second groups of characters such that identical groups of characters will result in identical hash numbers.

5. The system of claim 4 wherein said processing means includes comparison means for comparing hash numbers generated from sentences, words and characters of said first and second groups.

6. The system of claim 5 wherein said processing means includes second logic means for creating lists of data in said memory means.

7. The system of claim 6 wherein said processing means includes searching means for identifying and retrieving selected information from said lists of data.

8. The system of claim 7 wherein said processing means includes interrupt detection means for detecting the presence of an interrupt signal and transferring control to a selected location in said memory means.

9. The system of claim 8 wherein said processing means further includes timer means for generating a signal at designated intervals.

10. The system of claim 1 wherein said display means comprises a Cathode Ray Tube.

11. The system of claim 1 wherein said display means comprises a printer.

[12. A method for identifying and displaying the differences between first and second documents, said documents comprising groups of alphanumeric characters including words, lines and sentences comprising the steps of:

storing each of said documents in a memory;

generating hash numbers from said lines and sentences of each of said documents, such that identical lines and identical sentences produce identical corresponding hash numbers;

comparing hash numbers generated for said first document with hash numbers generated from said second document;

creating lists of anchorpoints in said memory, said anchorpoints representing matching hash numbers from each of said documents;

defining blocks of identical text in both documents containing at least one anchorpoint;

defining difference blocks of text not contained in said identity blocks;

storing in memory the location in each document of said identity and difference blocks;

classifying said identity and difference blocks into one of a plurality of classifications and storing said classifications in memory;

displaying said identity and difference blocks and said classifications.]

13. [The] *A* method [as identified by claim 12 further comprising the step of] *for identifying and displaying the differences between first and second documents, said documents comprising groups of alphanumeric characters, including words, lines and sentences comprising the steps of:*

*storing each of said documents in a memory;*

*generating hash numbers from said lines and sentences of each of said documents, such that identical lines and identical sentences produce identical corresponding hash numbers;*

*comparing hash numbers generated for said first document with hash numbers generated from said second document;*

*creating lists of anchorpoints in said memory, said anchorpoints representing matching hash numbers from each of said documents;* defining identity blocks *of identical text in both documents containing at least one anchorpoint* by comparison of the characters in each document radiating outward from said anchorpoints;

*defining difference blocks of text not contained in said identity blocks;*

*storing in memory the location in each document of said identity and difference blocks;*

*classifying said identity and difference blocks into one of a plurality of classifications and storing said classifications in memory;*

*displaying said identity and difference blocks and said classifications.*

14. The method as defined by claim 13 further comprising the step of deleting from memory all anchorpoints contained within each of said identity blocks.

15. The method as defined by claim 14 further comprising the step of associating a location of difference blocks in said first document with a corresponding location in said second document.

16. The method as defined by claim 15 further comprising the step of repeating all above steps on successively smaller blocks or characters within said difference blocks to identify small identity blocks within said difference blocks.

17. The method as defined by claim 16 wherein said small identity blocks comprise a selected number of characters.

18. The method as defined by claim 17 further comprising the step of stimultaneously displaying selected portions of each document.

19. The method as defined by claim 18 further comprising the step of displaying said classifications of said identity and difference blocks.

20. The method as defined by claim 19 further comprising the step of simultaneously displaying corresponding blocks from said first and second documents.

21. In a computer controlled display system having a display wherein first and second groups of characters are simultaneously displayed and differences between said first and second groups are indicated on said display, a method for displaying said groups and said differences comprising the steps of:

generating and displaying said first group of characters on a first region of said display;

generating and displaying said second group of characters on a second region of said display;

controlling the scrolling of said first and second regions so that the group of characters in said second region correspond to the group of characters in said first region;

determining differences between said first and second groups of characters;

generating and displaying indicators in said first and second regions, said indicators identifying said differences between said first and second groups of characters;

whereby said first and second groups of characters and said differences are displayed.

22. The method of claim 21 further including the step of providing first and second cursors on said display, said first cursor displayed in said first region and said second cursor displayed in said second region, the position of said second cursor corresponding to the position of said first cursor.

*23. An automated text comparison system, comprising:*

*input means for receiving commands, and for providing electronic signals representing a plurality of characters representing words, short groups of words or phrases, and sentences;*

*memory means coupled to said input means for storing as binary representations at least first and second groups of said characters;*

*processing means coupled to said memory means and to said input means for detecting and identifying differences and identities between said words, short groups of words or phrases, and sentences which are represented by said first and second groups of said characters;*

*said processing means for detecting and identifying differences and identities including means for detecting and identifying words, short groups of words or phrases, and sentences which are identical in said first and second groups of characters when said differences and identities do not consist of a line of text or a group of lines of text and regardless of whether or not the text wraps around an end of a line or a plurality of lines, wherein when said identities have been determined, the remaining characters are differences;*

*display means coupled to said processing means for providing a display of said differences by displaying the text with the differences designated within the text lines.*

*24. An automated text comparison system according to claim 23 wherein said processing means further includes means operable when an identical word, short groups of words or phrase or sentence is detected in said first and second group of characters, for identifying the longest possible identical sequence of characters in said first and second group of characters which contain said identical word, short groups of words or phrase, or sentence.*

*25. An automated text comparison system, comprising:*

*input means for receiving commands, and for providing electronic signals representing a plurality of characters representing words, short groups of words or phrases, and sentences;*

*memory means coupled to said input means for storing as binary representations at least first and second groups of said characters when said words and short groups of words or phrases which are identical do not consist of a line of text or a group of lines of text;*

*processing means coupled to said memory means and to said input means for detecting and identifying differences between said words, short groups of words or phrases and sentences which are represented by said first and second groups of said characters;*

*said processing means for detecting and identifying differences including means for detecting and identifying words and short groups of words or phrases which are identical in said first and second group of characters and regardless of whether or not the text wraps around an end of a line or a plurality of lines, said words and short groups of words or phrases being contained in sentences that are not necessarily identical in said first and second groups of characters;*

*display means coupled to said processing means for providing a display of said differences by displaying the text with the differences designated within the text lines.*

*26. An automated text comparison system, comprising:*

*input means for receiving commands, and for providing electronic signals representing a plurality of characters representing words, short groups of words or phrases, and sentences;*

*memory means coupled to said input means for storing as binary representations at least first and second groups of said characters;*

*processing means coupled to said memory means and to said input means for detecting and identifying differences and identities between said words, short groups of words or phrases, and sentences which are represented by said first and second groups of said characters;*

*said processing means for detecting and identifying differences and identities including means for detecting and identifying words and short groups of words or phrases which are different in said first and second groups of characters when said words and short groups of words or phrases which are different do not consist of a line of text or a group of lines of text and regardless of whether or not the text wraps around an end of a line or a plurality of lines, said words and short groups of words or phrases being contained in sentences that are otherwise identical in said first and second groups of characters;*

*display means coupled to said processing means for providing a display of said differences by displaying the text with the differences designated within the text lines.*

*27. An automated text comparison system comprising:*

*input means for receiving commands and for providing electronic signals representing a plurality of characters representing words, short groups of words or phrases, and sentences;*

*memory means coupled to said input means for storing as binary representations at least first and second groups of said characters;*

*processing means coupled to said memory means and to said input means for detecting and identifying differences between said words and said short groups of words or phrases which are represented by said first and second groups of said characters, said processing means for detecting and identifying differences including means for detecting and identifying words and short groups of words or phrases which are identical in said first and second group of characters when said words and short groups of words or phrases which are identical do not consist of a line of text or a group of lines*

*of text and regardless of whether or not the text wraps around an end of a line or a plurality of lines, said words and short groups of words or phrases being contained in short groups of words or phrases that are not necessarily identical in said first and second groups of characters; and*

*a display means coupled to said processing means for providing a display of said differences by displaying the text with the differences designated within the text lines.*

*28. An automated text comparison system comprising:*

*input means for receiving commands and for providing electronic signals representing a plurality of characters representing words, short groups of words or phrases, and sentences;*

*memory means coupled to said input means for storing as binary representations at least first and second groups of said characters;*

*processing means coupled to said memory means and to said input means for detecting and identifying differences and identities between said words and said short groups of words or phrases which are represented by said first and second groups of said characters, said processing means for detecting and identifying differences and identities including means for detecting and identifying words and short groups of words or phrases which are different in said first and second group of characters when said words and short groups of words or phrases which are different do not consist of a line of text or a group of lines of text and regardless of whether or not the text wraps around an end of a line or a plurality of lines, said words and short groups of words or phrases being contained in short groups of words or phrases that are otherwise identical in said first and second groups of characters; and*

*a display means coupled to said processing means for providing a display of said differences by displaying the text with the differences designated within the text lines.*

* * * * *